Patented Oct. 30, 1945

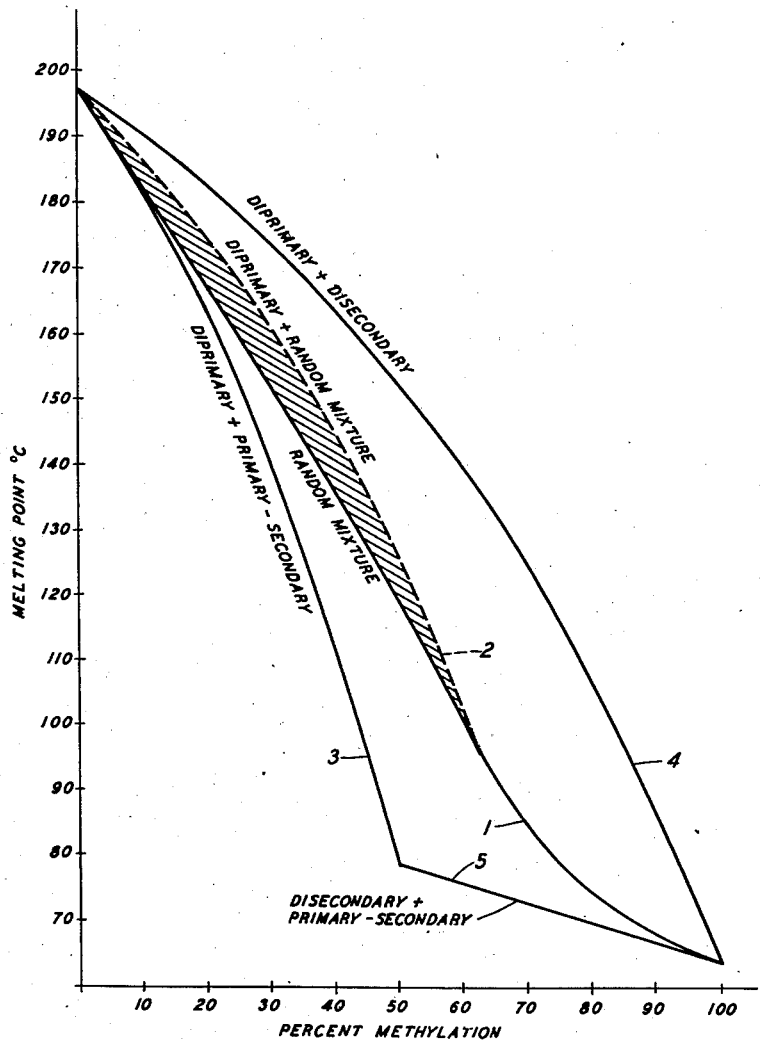

2,388,035

UNITED STATES PATENT OFFICE 2,388,035

POLYAMIDES

Carl J. Frosch, Summit, N. J., assignor to Bell Telephone Laboratories, Incorporated, New York, N. Y., a corporation of New York Application February 11, 1942, Serial No. 430,392

13 Claims. (Cl. 260—78)

This invention relates to condensation polymers or, more specifically, to polyamides.

Microcrystalline linear polyamides as described, for instance, in United States patents, 2,071,253 and 2,130,523 have been found useful for many purposes, such as the formation of synthetic textile fibers and the preparation of molding, coating or impregnating compositions. However, such polyamides, even those of sufficiently high molecular weight to possess the property of cold drawing, have been found disadvantageous for many purposes because of the fact that in their state of physical equilibrium (as produced, for instance, by annealing) they have such a high degree of crystallinity that they are opaque and brittle. In the manufacture of articles having large surface areas compared to their volumes, such as thin films, by the solidification of polyamides from the molten state, this brittleness often does not appear immediately since heat is radiated or otherwise removed from the body sufficiently rapidly to exert a quenching action which prevents complete crystallization.

The increase in the flexibility and toughness of polyamides due to quenching was taken advantage of in United States patents, 2,212,770 and 2,212,772 which describe expedients for rapidly quenching polyamides in the formation of thin bodies. However, such quenched polyamides are in a supercooled state and tend to change slowly to their more stable crystalline state over a period of time. This conversion is usually relatively slow at ordinary temperatures but increases in rapidity at somewhat elevated temperatures. Thus, for the formation of objects which must retain their toughness and flexibility over long periods of time, particularly at slightly elevated temperatures, quenched polyamides may not be satisfactory. Strains which are introduced into the body by quenching and affect its physical strength cannot be removed by annealing since annealing induces complete crystallization. Moreover, in the formation of bodies having a relatively large volume as compared to surface area, it is impossible to extract heat sufficiently rapidly from the interior to cause a thorough quenching action so that the production of a uniformly non-brittle body of considerable thickness is impossible by this procedure.

As an alternative to quenching, it has been suggested to incorporate plasticizers into polyamide bodies in order to increase their transparency and pliability. By this means non-brittle moldings of relatively large mass may be prepared. However, plasticizers are objectionable since they tend to migrate in the body over a period of time causing non-uniformity and even loss of the plasticizer. Moreover, when polyamides are used for electrical purposes, the use of a plasticizer is undesirable because of its effect upon the electrical properties of the material.

The polyamides commercially available at the present time are produced by the reaction of a polymethylene primary diamine, such as hexamethylene diamine, with a polymethylene dicarboxylic acid, such as adipic acid. The hexamethylene diamine for this reaction is produced by the catalytic hydrogenation of adiponitrile in the presence of ammonia as described, for instance, in United States Patent 2,166,151.

The present invention provides polyamides produced in a simple and inexpensive manner which are free from the above-mentioned disadvantages. According to the most specific phase of the present invention, polyamides are prepared by the reaction of a polymethylene dicarboxylic acid, such as adipic acid, with a mixture of polymethylene diamines, such as is produced by replacing ammonia in the diamine-forming reaction referred to above, in whole or in part by a mono-alkyl mono-amine, such as methyl amine. The diamines produced by this substitution of an alkyl amine for ammonia are not primary diamines, but are made up of a random mixture of primary diamines, diamines having an alkyl substituent on one of their amino groups, and diamines having an alkyl substituent on both of their amino groups. In this mixture there is a random distribution of primary and secondary amino groups among the compounds. That is to say, the relative proportions of diprimary diamine, primary-secondary diamine and disecondary diamine in such a mixture are as $A^2$, $2AB$ and $B^2$, respectively, where A is the mol proportion of primary amino groups and B is the mol proportion of secondary amino groups. The relative values of A and B are dependent upon the concentration of mono-alkyl mono-amine in the hydrogenation mixture. Preferably the alkyl amine and ammonia are present in the initial reaction mixture in an amount such that the sum of the mols of each constitutes 8 or more mols per mol of dinitrile. This method for the production of diamine mixtures is more particularly described and claimed in the copending application of B. S. Biggs, Serial No. 406,833, filed August 14, 1941.

The polyamides of the present invention may be prepared from such a diamine mixture together with a dicarboxylic acid in the same manner as polyamides are produced from primary diamines and dicarboxylic acids as described, for instance, in United States Patent 2,130,523. Thus, substantially equivalent amounts of the diamine mixture and a dicarboxylic acid may be heated together in an inert atmosphere while being subjected to agitation by bubbling an inert gas, such as dry, oxygen-free hydrogen or nitrogen, through the reaction mixture, with or without the application of reduced pressure, or by vigorously stirring under reduced pressure, until a polyamide of the desired molecular weight is produced. Although the reactivity of secondary amino groups is less than that of primary amino groups, the polyamide-forming reaction can be made sufficiently rapid by the use of suitable catalysts. To secure a high order of strength and toughness in the product, it is ordinarily desirable to continue the polyamide-forming reaction until average molecular weights considerably in excess of 8,000 to 10,000 (as determined by the Staudinger viscosity method) are produced, corresponding to the range in which the phenomenon of cold drawing appears in those polyamides which are microcrystalline at room temperatures.

The properties of polyamides produced by reacting such random diamine mixtures with a dicarboxylic acid are dependent upon the relative proportion of primary and secondary amino groups in the diamine mixture. As stated above, the polyamides formed from polymethylene diprimary diamines and polymethylene dicarboxylic acids are excessively brittle in the annealed state. A beneficial effect in reducing this brittleness can be detected when as few as 5 per cent of the primary amino groups in the polyamide-forming reaction mixture are replaced by an amino group having an alkyl substituent. As the percentage of secondary amino groups is increased, the polyamide becomes increasingly flexible in the annealed state, becomes lower in melting point, becomes easier to cold draw, decreases in hardness and increases in its transparency and its solubility in organic solvents. As the hardness and melting point decrease with increasing degrees of substitution, the polyamides ultimately become somewhat rubber-like in their properties. As the degree of substitution approaches 100 per cent, the polyamides approach in their properties the polyamides produced from disecondary diamines and dicarboxylic acids. The pure disecondary polyamides may be solids at room temperatures as in the case of the polyamide produced from N-N'-dimethyl decamethylene diamine and sebacic acid, or viscous, gummy liquids as in the case of polyamides produced from N-N'-dimethyl hexamethylene diamine and adipic acid.

The placing of substituents on the amide linkages of the polyamides is thus essentially similar to the addition of a plasticizer in that the crystallinity is progressively reduced with increasing substitution. However, the substituents are built into the molecule and are, therefore, not subject to the common disadvantages of plasticizers. The partially substituted polyamides of the present invention, where the substitution is less than about 50 per cent, are very similar to the quenched polyamides but differ in that they retain their desirable flexibility even when annealed.

The most desirable substituent on the amino groups for the purpose of the present invention is a methyl group, because of the availability of methyl amine for forming the diamine mixtures and because the polyamide-forming reaction proceeds most readily when methyl substituted diamines are employed. However, any alkyl substituent may be employed, preferably one containing not more than six carbon atoms. Thus, ethyl, propyl, butyl, amyl or cyclohexyl groups may be employed as substituents for the purposes of the present invention. It is also possible to employ any other hydrocarbon substituents in which the carbon atom bonded directly to the amino nitrogen is not a member of an aromatic ring. Such a hydrocarbon substituent should contain no non-benzenoid unsaturation. Such a hydrocarbon substituent should also be monovalent. A divalent hydrocarbon substituent which forms a bridge between two amide nitrogens, as in the case of polyamides formed from piperazine and a dicarboxylic acid, is not suitable for purposes of the present invention. Obviously, other organic monovalent radicals which contain no groups reactant with the other ingredients of the polyamide-forming reaction mixture may be employed as substituents on the amino groups.

In place of producing polyamides containing substituents on their amide nitrogens by employing a random mixture of diprimary, primary-secondary and disecondary amines, as described above, another commercially feasible method is to use a diamine mixture produced by mixing a diprimary diamine with such a random mixture. This method possesses the advantage that where it is desired to produce various polyamides of different degrees of flexibility and hardness, it is not necessary to vary the process by which the random diamine mixture is produced in order to vary the ratio of substituted to primary amino groups in the polyamide-forming reaction mixture. Instead a single random mixture containing the highest proportion of substituted amino groups (for instance, about 60 per cent or less for molding compounds) which it would be desirable to use may be prepared. This random mixture may be mixed with any desired amount of diprimary diamine to secure the desired ratio of primary and substituted amino groups. When desired, random mixtures having up to about 90 per cent secondary amino groups may be mixed with any amount of diprimary diamine to give the desired proportions of primary and secondary amino groups.

Obviously, polyamides containing any desired ratio of primary amino groups to substituted amino groups may also be obtained by reacting a dicarboxylic acid with any mixture of any two or more of a diprimary diamine, a disecondary diamine or a primary-secondary diamine.

However, it should be noted that the properties of any particular type of polyamide are dependent not only on the ratio of primary to substituted amino groups but also on the distribution of these amino groups among the diprimary, primary-secondary and disecondary diamines. This dependence of properties upon the distribution of the amino groups may be understood more clearly by reference to the drawing which shows, by way of illustration, curves showing the variation of the melting point of decamethylene sebacamide with varying degrees of substitution of methyl groups on the amide linkages and with varying distribution of the substituted groups.

Five separate curves are shown in the drawing. These curves were plotted by measuring the melting points of polyamides prepared by reacting sebacic acid with mixtures of various decamethylene diamines. Curve 1 shows the variation of the melting points of polyamides prepared from sebacic acid and mixtures of decamethylene diamines having methyl substituents randomly distributed on their amino groups, where the percentage substitution varies from 0 to 100 per cent. Curve 2 shows the melting points of polyamides prepared by reacting sebacic acid with a diamine mixture made up by adding varying proportions of diprimary decamethylene diamine to a random decamethylene diamine mixture containing 62.5 per cent methyl substitution. The shaded area between these two curves represents the most desirable field of operation of the present invention. All curves plotted for polyamides prepared from diamine mixtures made by adding diprimary decamethylene diamine to random diamine mixtures containing less than 62.5 per cent methyl substitution will fall within this area.

Curve 3 shows the melting points of polyamides prepared from sebacic acid and diamine mixtures made up of proportions of diprimary decamethylene diamine and N-methyl decamethylene diamine varying between the pure diprimary and the pure primary-secondary diamine. Curve 4 shows the melting points of polyamides prepared from sebacic acid and diamine mixtures made up of varying proportions of the diprimary and the disecondary diamines. Curve 5 shows the melting points of polyamides prepared from sebacic acid and varying proportions of the primary-secondary and the disecondary diamine.

The percentage methylation of the amino nitrogens for each particular polyamide is plotted on the horizontal axis; the melting point of the polyamide is plotted on the vertical axis. Curves 3, 4 and 5 form a triangle the apices of which are the pure diprimary polyamide melting at 197° C., the pure disecondary polyamide melting at 63° C. and the pure primary-secondary polyamide melting at 78° C. It can be seen that the polyamides formed from the mixture of diprimary and disecondary diamines have a consistently higher melting point for the same degree of methylation than do the polyamides formed from mixtures of the primary-secondary diamine with either the diprimary or the disecondary diamine. The melting points of the polyamides produced from the random diamine mixture are intermediate, lying along a curve running from the pure diprimary diamine point to the pure disecondary diamine point.

For any particular polyamide series the physical properties of the polymer are closely related to its melting point. Two polyamides of the same series having different degrees of substitution and different distributions of the substituted groups will have closely related physical properties if their melting points are the same. Therefore, the melting point can be set up as a criterion for the desirable polyamides for any particular use.

For any particular polyamide series containing varying percentages of substituted amino groups there is a region in which the polymers retain much of the hardness of the unsubstituted polyamide and still have enough permanent flexibility that thin sheets may be flexed many times without being broken. For the decamethylene sebacamide series of polyamides this region occurs at a melting point of about 170° C., corresponding to about 19 per cent methyl substitution on the amino nitrogens for the polyamide prepared from a random diamine mixture, but corresponding to lower and higher degrees of substitution for other mixtures. For other polyamide series this region occurs at different melting points. For the hexamethylene adipamide series it occurs at about 200° C. corresponding to about 35 per cent methyl substitution for the polyamide prepared from a random diamine mixture. For the hexamethylene sebacamide series this region occurs at about 185° C.

These substances are the most suitable ones for molding since they are flexible even when cooled very slowly and hence can be used in thick moldings, whereas the corresponding unsubstituted polyamides become brittle under such conditions. They are also suitable for extruded coatings, as for wire, since they are tough and flexible and their use for this purpose would make quenching unnecessary. At somewhat higher per cent substitutions (lower melting points) the polyamides become quite soft and elastic and in this range they are adapted for use as special rubbers, particularly for use in contact with grease or gasoline. They are also useful as flexible bonding agents for glass, wood, metal or other materials when applied either from molten state or from solution. The fact that more highly substituted polyamides are appreciably soluble in a number of common solvents makes them useful as ingredients in paints and lacquers.

Although the brittleness of the substituted polyamides increases as the melting point is raised, satisfactory molding compounds can be produced from decamethylene sebacamides with melting points as high as 185° C. or slightly higher. However, preferably such polyamides have melting points below 180° C. As the melting point decreases, the hardness decreases to a degree such that for ordinary rigid moldings it is not desirable to employ a polyamide melting below about 90° C. Ordinarily decamethylene sebacamides melting above 125° C. will be most suitable for this purpose. However, where the softness is not considered objectionable, polyamides melting as low as those containing about 90 per cent or more substituted amide groups may be employed.

The melting points referred to above are applicable regardless of the substituent employed, whether methyl, ethyl, propyl, butyl, amyl, cyclohexyl or other radical. However, with different substituents the melting point is not the same for the same percentage substitution and the same distribution. The methyl substituted polyamides are higher melting than the others for the same degree of substitution. The alkyl substituents between ethyl and hexyl, however, produce substantially the same melting points for the same degree of substitution and the same distribution of substituted groups. For a decamethylene sebacamides prepared from diamine mixtures having a random distribution of substituted and unsubstituted amino groups, the percentage substitution corresponding to the temperatures given above are as follows for methyl substituents and for alkyl substituents lying between ethyl and hexyl:

|  | Percentage substitution | |
|---|---|---|
| Melting point °C. | Methyl substituent | Ethyl to hexyl substituent |
| 185 | 9 | 6 |
| 180 | 12 | 8 |
| 170 | 19 | 13 |
| 125 | 46 | 33 |
| 90 | 66 | 48 |

A variation of melting point with degree of substitution and with distribution of the substituted groups very similar to that described above in connection with decamethylene sebacamide is obtained with polyamides produced from adipic acid and hexamethylene diamine mixtures. However, this polyamide series differs from the decamethylene sebacamide series in that the completely substituted polyamide and the highly substituted polyamides have melting points below room temperature and are normally sticky, gummy masses.

As stated above, the partially substituted hexamethylene adipamides most suitable for molding are those having melting points in the vicinity of about 200° C. Satisfactory molding compounds can be produced, however, with these polyamides when they have melting points as high as 235° C. or even slightly higher. However, preferably for this purpose such polyamides have melting points below about 220° C. and above about 160° C. For ordinary rigid moldings it is not desirable to employ a polyamide melting below about 90° C. Those hexamethylene adipamides melting below room temperature are very suitable as permanently sticky adhesives and polymers having up to about 90 per cent substitution or even somewhat higher will be found suitable for this purpose.

The temperatures set forth above are applicable regardless of the nature of the substituent on the amide groups. Unsubstituted hexamethylene adipamide melts at about 260° C. For hexamethylene adipamides prepared from diamine mixtures having a random distribution of substituted and unsubstituted amino groups, the percentage substitution corresponding to the temperatures given above for both methyl substituents and for alkyl substituents lying between ethyl and hexyl are given below:

| Melting point °C. | Percentage substitution | |
| --- | --- | --- |
| | Methyl substituent | Ethyl to hexyl substituent |
| 260 | 0 | 0 |
| 235 | 16 | 12 |
| 220 | 24 | 19 |
| 200 | 35 | 28 |
| 160 | 51 | 42 |
| 90 | 59 | 54 |

As stated above the most desirable partially substituted hexamethylene sebacamides are those melting in the vicinity of about 185° C. For molding purposes such polyamides preferably have a melting point below about 200° C. and above about 150° C. corresponding to percentage substitutions for the polyamides produced from random diamine mixtures of about 17 per cent and about 47 per cent, respectively, for methyl substituents, and about 12 per cent and about 36 per cent, respectively, for alkyl substituents between ethyl and hexyl. However, as in the case of the other polyamides mentioned above, the polyamides of this series will be found useful for other purposes when melting down to 90° C. or even lower up to a point corresponding to about 90 per cent subtitution.

For partially substituted decamethylene adipamides the most desirable polymers for molding melt in the vicinity of 190° C. The polyamides melting within the range of about 155° C. to 205° C. will be found most suitable for this purpose. However, polyamides melting as high as 215° C. or even higher may be employed. For other purposes polyamides melting down to 90° C. or even lower down to temperatures corresponding to about 90 per cent substitution will be found suitable.

Variations of melting point and correlated properties with change in percentage substitution and distribution of the substituted groups similar to those described above will be obtained with other polyamide series prepared from polymethylene dicarboxylic acids and polymethylene diamine mixtures, where the sum of the carbon atoms in the dicarboxylic acid and the polymethylene chain of the diamine is less than 40 but more than 6. The desirable melting point range for molding will vary with each series but, in general, will be somewhat lower with increasing number of carbon atoms. The upper limit to the number of carbon atoms is set by the fact that the number of amide linkages per unit of chain length in the polymer decreases as the number of carbon atoms in the chain increases. Therefore, as the amide linkages become more diluted the effect of substitution becomes less marked. The lower limit to the number of carbon atoms is set only by the ability of the reactants to form linear polyamides.

Among the polyamides which may be modified according to the present invention may be mentioned those produced by reacting glutaric, adipic, pimelic, suberic, azelaic, sebacic, octadecandioic or any other straight chain dicarboxylic acid of the structural formula:

$$COOH—(CH_2)_x—COOH$$

with a mixture of diamines containing both primary and substituted amino groups, such as mixtures of ethylene diamines, trimethylene diamines, tetramethylene diamines, pentamethylene diamines, hexamethylene diamines, decamethylene diamines, octadecamethylene diamines or any other diamines of the structural formula:

$$NH_2—(CH_2)_y—NH_2$$

where $x$ and $y$ are integers.

Not only polyamides produced from dicarboxylic acids and diamines but also polyamides produced from straight chain polymethylene amino acids containing between 5 and 20 carbon atoms in their polymethylene chains may be modified according to the present invention. For instance, 11-amino undecyclic acid may be copolymerized with any amount of N-methyl 11-amino undecyclic acid to produce a partially substituted polyamide having any desired degree of substitution. The same substituents may be employed on the amino groups of the amino acids as on the amino groups of the diamines described above. The effect of the introduction of substituted amino groups in polyamides formed from amino acids is similar to the effect produced on polyamides formed from dicarboxylic acids and diamines.

The description above refers to polyamides produced from straight chain polymethylene reactants. Such polyamides are the simplest to prepare. They are also the most highly crystalline when containing no N-substituted amide linkages and are, therefore, the most objectionable from the standpoint of brittleness in the annealed state. When the polymethylene chains contain substituted side chains or contain hetero atoms such as oxygen or sulphur, the polyamides are less crystalline, possess lower melting points and are, therefore, less brittle in the annealed state. Therefore, there is less advantage in the use of substituted amide groups in polyamides of this type than in the straight chain polymethylene polyamides. However, where it is desired to lower the melting point, increase flexibility or decrease hardness, any normally crystalline linear polyamide regardless of its chemical structure may be prepared from the appropriate mixture of polyamide-forming ingredients containing both primary and substituted amino groups in order to obtain the advantages of the present invention.

The following specific examples will illustrate the manner in which the present invention may be practiced:

Example 1

A mixture of decamethylene diamine, N-methyl decamethylene diamine and N-N'-dimethyl decamethylene diamine having a random distribution of primary and substituted amino groups was prepared by hydrogenating sebaconitrile in the presence of a nickel catalyst together with 4.6 mols of methyl amine and 3.4 mols of ammonia per mol of sebaconitrile. The resulting mixture of diamines contained a methyl substituent on 17 per cent of its amino groups. 179.1 parts of this diamine mixture was heated in a closed reaction vessel with 205.3 parts of sebacic acid at a temperature of 250° C. in the presence of .2 part of zinc chloride as a catalyst. During the entire reaction, dry, oxygen-free hydrogen was bubbled through the molten reaction mixture and withdrawn from the vessel together with the water vapor evolved. After 45 hours the reaction was discontinued and a polymer having a pale amber color and melting at 171° C. was produced. This polymer was capable of being cold drawn into very strong fibers. It was hard enough to be suitable for many molded objects but was sufficiently flexible so that, even when annealed, a 45-mil sheet could be bent double many times without being broken.

Example 2

6.67 parts of a decamethylene diamine mixture having a methyl substituent randomly distributed on 61.4 per cent of its amino groups was heated at 255° C. in a closed reaction vessel with 7.13 parts of sebacic acid in the presence of .01 part of zinc chloride as a catalyst while bubbling dry, oxygen-free hydrogen through the reaction mixture. After 23 hours a very viscous, almost water-white polymer was produced which had a melting point of 97° C. It could be cold drawn to form strong fibers and was permanently flexible even when annealed. Although it could be marked with the fingernail, it was suitable for soft molded articles. This polyamide was soluble in alcohol-chloroform mixtures.

Example 3

4.93 parts of N-N'-dimethyl decamethylene diamine was heated at 250° C. in a closed reaction vessel together with 4.98 parts of sebacic acid and 5.74 parts of decamethylene diamine sebacate in the presence of .01 part of zinc chloride as a catalyst while dry, oxygen-free hydrogen was bubbled continuously through the reaction mixture. After 9 days a viscous, almost water-white polyamide melting at 139° C. and having a methyl substituent on 61.4 per cent of its amide groups was produced. This polymer was permanently flexible and could be readily cold drawn. When annealed in the form of a sheet it had the feel of soft leather. This polyamide possessed the same degree of substitution as the polyamide described in Example 2 but had a different distribution of methyl groups.

Example 4

3 parts of N-N'-dimethyl decamethylene diamine were heated at 250° C. in a closed reaction vessel with 3.03 parts of sebacic acid and 11.22 parts of decamethylene diamine sebacate in the presence of .01 part of zinc chloride as a catalyst while dry, oxygen-free hydrogen was continuously bubbled through the reaction mixture. After 65 hours a viscous, almost water-white polyamide was produced having a melting point of 171° C. and having methyl substituents on 33⅓ per cent of its amide groups. This polyamide was similar in its properties to that described in Example 1 which had the same melting point but a different degree of substitution and a different distribution of its substituted methyl groups.

Example 5

1.274 parts of a mixture containing 28 per cent N-N'-diethyl decamethylene diamine and 72 per cent N-ethyl decamethylene diamine were heated at 255° C. in a closed vessel together with 1.145 parts of sebacic acid and 10.36 parts of decamethylene diamine sebacate in the presence of .01 part of zinc chloride as a catalyst while dry, oxygen-free hydrogen was continuously bubbled through the reaction mixture. After 65 hours a viscous, water-white polyamide having an ethyl substituent on 11 per cent of its amide groups and melting at 172° C. was produced. This polymer could be cold drawn readily to form exceptionally strong fibers. It was sufficiently hard to be used for many molded objects and its annealed sheets remained permanently flexible.

Example 6

2.13 parts of a 37.5 per cent amyl substituted decamethylene diamine sebacate, prepared by reacting sebacic acid with a diamine mixture containing 75 per cent N-amyl decamethylene diamine and 25 per cent decamethylene diamine, was heated in a closed reaction vessel at 250° C. with 2.85 parts of dacamethylene diamine sebacate in the presence of .004 part of zinc chloride as a catalyst while dry, oxygen-free hydrogen was continuously bubbled through the reaction mixture. After 17 hours a viscous, amber-colored polyamide melting at 166° C. and having an amyl substituent on 15 per cent of its amide groups was produced. This polyamide could be readily cold drawn to form strong fibers. It was permanently flexible and hard enough to be used for many molded objects.

Example 7

2.13 parts of a 47 per cent butyl substituted decamethylene diamine sebacate prepared by reacting sebacic acid with a diamine mixture made up of 94 per cent N-butyl decamethylene diamine and 6 per cent decamethylene diamine were heated in a closed reaction vessel at 250° C. together with 3.98 parts of decamethylene diamine sebacate in the presence of .004 part of zinc chloride as a catalyst while dry, oxygen-free hydrogen was continuously bubbled through the reaction mixture. After 24 hours a viscous, amber-colored polyamide melting at 164° C. and having a butyl substituent on 15 per cent of its amide groups was produced. This polyamide could be readily cold drawn. In its physical properties it resembled the 15 per cent amylated polyamide described in Example 6 and the 11 per cent ethylated polyamide described in Example 5.

Example 8

10 parts of a hexamethylene diamine mixture having a randomly distributed methyl substituent on 25 per cent of its amino groups was heated with an equivalent amount of adipic acid in a closed reaction vessel at 250° C. while bubbling dry, oxygen-free hydrogen through the reaction mixture. After 46 hours an amber-colored polyamide melting at 223° C. was produced. This polyamide could be cold drawn readily and was very hard and moderately flexible.

Example 9

2.72 parts of a random diamine mixture containing 52 per cent N-N'-dimethyl hexamethylene diamine, 40.2 per cent N-methyl hexamethylene diamine and 7.8 per cent hexamethylene diamine were heated in a closed reaction vessel at 250° C. together with 1.86 parts of hexamethylene diamine and 5.26 parts of adipic acid in the presence of .006 part of zinc chloride as a catalyst while dry, oxygen-free hydrogen was continuously bubbled through the reaction mixture. After 46 hours a viscous brown polyamide melting at 201° C. and having a methyl substituent on 40 per cent of its amide groups was produced. This polyamide could be readily cold drawn to strong fibers. It was permanently flexible in the form of annealed sheets but sufficiently hard for use as a molding material.

Example 10

2.88 parts of N-N'-dimethyl hexamethylene diamine, 2.32 parts of hexamethylene diamine and 5.84 parts of adipic acid were heated together in a closed reaction vessel at 250° C. in the presence of .006 part zinc chloride as a catalyst while dry, oxygen-free hydrogen was continuously bubbled through the reaction mixture. After 25 hours a viscous, amber-colored polyamide melting at 191° C. and having a methyl substituent on 50 per cent of its amide groups was produced. In its physical properties this polyamide resembled that produced in Example 9.

Example 11

2.93 parts of a diamine mixture containing 12.5 per cent N-N'-diethyl hexamethylene diamine and 87.5 per cent N-ethyl hexamethylene diamine were heated in a closed reaction vessel at 250° C. together with 2.92 parts of adipic acid and 4.60 parts of hexamethylene diamine adipate in the presence of .006 part of zinc chloride as a catalyst while bubbling dry, oxygen-free hydrogen through the reaction mixture. After 24 hours a viscous, amber-colored polyamide melting at 197° C. and having ethyl substituents on 30 per cent of its amide groups was produced. This polyamide could be cold drawn, was flexible and was suitable for use as a molding material.

Example 12

1.57 parts of a diamine mixture containing 97 per cent N-propyl hexamethylene diamine and 3 per cent hexamethylene diamine were heated in a closed reaction vessel at 250° C. together with 1.46 parts of adipic acid and 5.85 parts of hexamethylene diamine adipate in the presence of .006 part of zinc chloride as a catalyst while bubbling dry, oxygen-free hydrogen through the reaction mixture. After 44 hours a viscous, light yellow polyamide was produced melting at 223° C. and having propyl substituents on 15 per cent of its amide groups. In its physical properties this polyamide resembled that produced in Example 8.

Example 13

.7 part of a diamine mixture containing 36 per cent N-N'-diamyl hexamethylene diamine and 64 per cent N-amyl hexamethylene diamine were heated in a closed reaction vessel at 250° C. together with .67 part of sebacic acid and .374 part of hexamethylene diamine sebacate in the presence of .004 part of zinc chloride as a catalyst while bubbling dry, oxygen-free hydrogen through the reaction mixture. After 24 hours a viscous, light amber polyamide melting at 198° C. and having amyl substituents on 15 per cent of its amide groups was produced. This polyamide could be cold drawn, was hard and of sufficient flexibility to be suitable as a molding material.

Example 14

1.92 parts of a diamine mixture containing 44 per cent N-N'-dimethyl decamethylene diamine and 56 per cent N-methyl decamethylene diamine were heated in a closed reaction vessel at 250° C. together with 1.46 parts of adipic acid and 4.45 parts of decamethylene diamine adipate in the presence of .005 part of zinc chloride as a catalyst while bubbling dry, oxygen-free hydrogen through the reaction mixture. After 16 hours a viscous, light amber polyamide melting at 174° C. and having methyl substituents on 30 per cent of its amide groups was produced. This polyamide was flexible and could be readily cold drawn. It possessed properties suiting it for use as a molding material.

As stated above, the polyamides of the present invention may be used for many purposes. The harder polyamides are suitable for forming plastic moldings, whereas the softer polyamides may be used as rubber substitutes. These polyamides may be also used for forming sheets to be used for wrapping, for forming condenser dielectrics, for interleaving coil layers or for similar uses. They may also be used for forming photographic films, artificial leather or textile fibers. They are also useful for forming insulating or protective coatings on bare or textile-covered wire. They are particularly suitable for impregnating braided textile coverings over rubber-covered wire, such as telephone drop wire which is adapted to be used outdoors in contact with the elements where it is subjected to abrasion by rubbing against other objects, such as the swaying branches of trees.

The polyamides of the present invention are particularly suited for use as adhesives. For use as an adhesive it is desirable that the bonding substance be capable of being reduced to a mobile fluid which has a low interfacial tension with the solid to be bonded, that the bonding agent have sufficient tensile strength so that it will not give under stress, that the bonding agent have a sufficiently high fusion point so that it will not weaken with increase in temperature and that it have sufficient toughness and flexibility to dissipate stresses and absorb shocks. Unsubstituted polymethylene polyamides meet these requirements in all respects except for their excessive brittleness in the annealed state. The polyamides of the present invention are not subject to this disadvantage since they can be made as flexible as desired.

The invention has been described in terms of its specific embodiments but certain modifications and equivalents will be apparent to those skilled in the art. Such modifications and equivalents are intended to be included within the scope of the present invention which is to be limited only by the reasonable scope of the appended claims.

What is claimed is:

1. A linear polyamide identical with the polyamide prepared by the condensation of a polymethylene dicarboxylic acid and a mixture of a diprimary polymethylene diamine, a polymethylene diamine having an alkyl substituent on one of its amino groups, the other amino group being unsubstituted, and a polymethylene diamine having an alkyl substituent on each of its amino groups, said alkyl substituent containing between one and six carbon atoms, said substituted amino groups making up between about 5 per cent and about 60 per cent of the total amino groups present, the proportions of each of said diamines in said diamine mixture being that produced by adding as much diprimary polymethylene diamine, as is necessary to produce the proper proportion of primary amino groups, to a diamine mixture containing not more than about 60 per cent alkyl substituted amino groups and having its diprimary, primary-secondary and disecondary diamines distributed in approximately the proportion $A^2$, $2AB$ and $B^2$, respectively, where A is the proportion of primary amino groups and B is the proportion of substituted amino groups.

2. A linear polyamide identical with the polyamide prepared by the condensation of sebacic acid and a mixture of diprimary decamethylene diamine, a primary-secondary decamethylene diamine and a disecondary decamethylene diamine, the latter three compounds being present in the proportion $A^2$, $2AB$ and $B^2$, respectively, where A is the proportion of primary amino groups and B is the proportion of secondary amino groups and B constitutes between about 9 per cent and about 90 per cent of the total amino groups, the substituents on said secondary amino groups being alkyl groups containing between one and six carbon atoms.

3. The polyamide described in claim 2, said polyamide having a melting point between about 125° C. and about 180° C.

4. A linear polyamide identical with the polyamide prepared by the condensation of adipic acid and a mixture of diprimary hexamethylene diamine, a primary-secondary hexamethylene diamine and a disecondary hexamethylene diamine, the latter three compounds being present in the proportion $A^2$, $2AB$ and $B^2$, respectively, where A is the proportion of primary amino groups and B is the proportion of secondary amino groups and B constitutes between about 15 per cent and about 90 per cent of the total amino groups, the substituents on said secondary amino groups being alkyl groups containing between one and six carbon atoms.

5. The polyamide described in claim 4, said polyamide having a melting point between about 160° C. and about 220° C.

6. A linear polyamide made up essentially of polymethylene radicals joined by amide linkages, between about 5 per cent and about 90 per cent of said amide linkages carrying, on their nitrogen atoms, monovalent saturated aliphatic hydrocarbon radicals containing between 1 and 6 carbon atoms, said polyamide being produced by the reaction, under linear polyamide forming conditions, of a polymethylene dicarboxylic acid and a random mixture of diprimary, primary-secondary and disecondary polymethylene diamines, which diamines are distributed in approximately the proportion $A^2$, $2AB$ and $B^2$, respectively, where A is the proportion of primary amino groups and B is the proportion of secondary amino groups in the diamine mixture.

7. A polyamide as described in claim 6 wherein the monovalent hydrocarbon substituents are methyl groups.

8. The polyamide described in claim 6 wherein the polymethylene dicarboxylic acid from which the polyamide is formed is sebacic acid and the polymethylene diamines contained in the diamine mixture are decamethylene diamines and wherein the monovalent hydrocarbon substituents are methyl groups which are present on between about 12 per cent and about 46 per cent of the amide nitrogen atoms.

9. The polyamide described in claim 6 wherein the polymethylene dicarboxylic acid from which the polyamide is formed is adipic acid and the polymethylene diamines contained in the diamine mixture are hexamethylene diamines and wherein the monovalent hydrocarbon substituents are methyl groups which are present on between about 24 per cent and about 51 per cent of the amide nitrogen atoms.

10. A linear polyamide made up essentially of recurring straight chains of single bonded carbon atoms joined by nitrogen atoms, successive alternate chains containing six and ten carbon atoms, one carbon atom joined to each nitrogen atom carrying a double bonded oxygen, each remaining carbon carrying two hydrogen atoms, between about 5 per cent and about 90 per cent of the nitrogen atoms carrying methyl groups, the remainder of the nitrogen atoms carrying hydrogen atoms, said polyamide being produced by the reaction, under linear polyamide forming conditions, of a dicarboxylic acid and a random mixture of diprimary, primary-secondary and disecondary diamines in which the substituents on the secondary amino groups are methyl groups, said diamines being distributed in approximately the proportion $A^2$, $2AB$ and $B^2$, respectively, where A is the proportion of primary amino groups and B is the proportion of secondary amino groups in the diamine mixture.

11. A polyamide as described in claim 6 wherein the monovalent hydrocarbon substituents are alkyl radicals and wherein the N-substituted amide linkages constitute between about 5 per cent and about 50 per cent of the total amide linkages.

12. A linear polyamide prepared by the condensation of a polymethylene dicarboxylic acid and a mixture of diprimary polymethylene diamine, a polymethylene diamine having a monovalent saturated aliphatic hydrocarbon substituent containing between 1 and 6 carbon atoms on one of its amino groups, the other amino group being unsubstituted and a polymethylene diamine having a monovalent saturated aliphatic hydrocarbon substituent containing between 1 and 6 carbon atoms on each of its amino groups, said substituted amino groups making up between about 5 per cent and about 90 per cent of the total amino groups present, the proportions of each of said diamines in said diamine mixture being those produced by adding a polymethylene diamine to a diamine mixture having its diprimary, primary-secondary and disecondary diamines distributed in the proportion $A^2$, $2AB$ and $B^2$, respectively, where A is the proportion of primary amino groups and B is the proportion of substituted amino groups.

13. The polyamide described in claim 12 wherein the monovalent hydrocarbon substituents are methyl groups and wherein the substituted amino groups constitute between about 5 per cent and about 60 per cent of the total amino groups.

CARL J. FROSCH.